United States Patent
Goodham

[11] Patent Number: 5,782,207
[45] Date of Patent: Jul. 21, 1998

[54] INTERACTIVE PET TOY

[76] Inventor: Thomas J. Goodham, 1821 NW. 65th St., Seattle, Wash. 98117

[21] Appl. No.: 791,733

[22] Filed: Jan. 31, 1997

[51] Int. Cl.$^6$ ............................................. A01K 29/00
[52] U.S. Cl. ............................................. 119/707
[58] Field of Search ................................. 119/707, 709, 119/711; 446/362, 489, 490

[56] References Cited

U.S. PATENT DOCUMENTS

| | | | |
|---|---|---|---|
| 473,881 | 4/1892 | Lee | 446/489 X |
| 2,032,871 | 3/1936 | Dammeyer | 446/490 |
| 4,499,855 | 2/1985 | Galkiewicz | 119/29 |
| 4,712,510 | 12/1987 | Tae-Ho | 119/29 |
| 4,770,123 | 9/1988 | Bell | 119/709 |
| 4,930,448 | 6/1990 | Robinson | 119/29 |
| 5,074,249 | 12/1991 | McMahon | 119/709 |
| 5,467,740 | 11/1995 | Redwine | 119/707 |
| 5,524,326 | 6/1996 | Markowitz | 119/707 |

*Primary Examiner*—Robert P. Swiatek
*Attorney, Agent, or Firm*—David S. Thompson

[57] ABSTRACT

A pet toy provides a tubular housing 60 having a toy mouse 80 that is extended from and retracted into the tubular housing by means of a bicycle brake or similar driving cable 40 that is manually operated by the cat's owner using a handle 20. The tubular housing carries a decorative cloth cover 67 and is closed at one end by an end cap 64 having a drilled hole 65 through which the bicycle cable passes. The outer hollow portion 44 of the bicycle cable is fastened to the end cap. The forward end of the the inner wire cable 41 extends through the tubular housing where it is attached to the mouse, while the rearward end of the inner cable is attached to the handle. The mouse provides a tubular body 81 having a cloth covering 84. Whisker-like filaments 85 extend from the forward end of the body 81 to attract the cat. The tubular body 81 is filled with glue, which keeps the whiskers and the inner wire cable securely fastened.

4 Claims, 2 Drawing Sheets

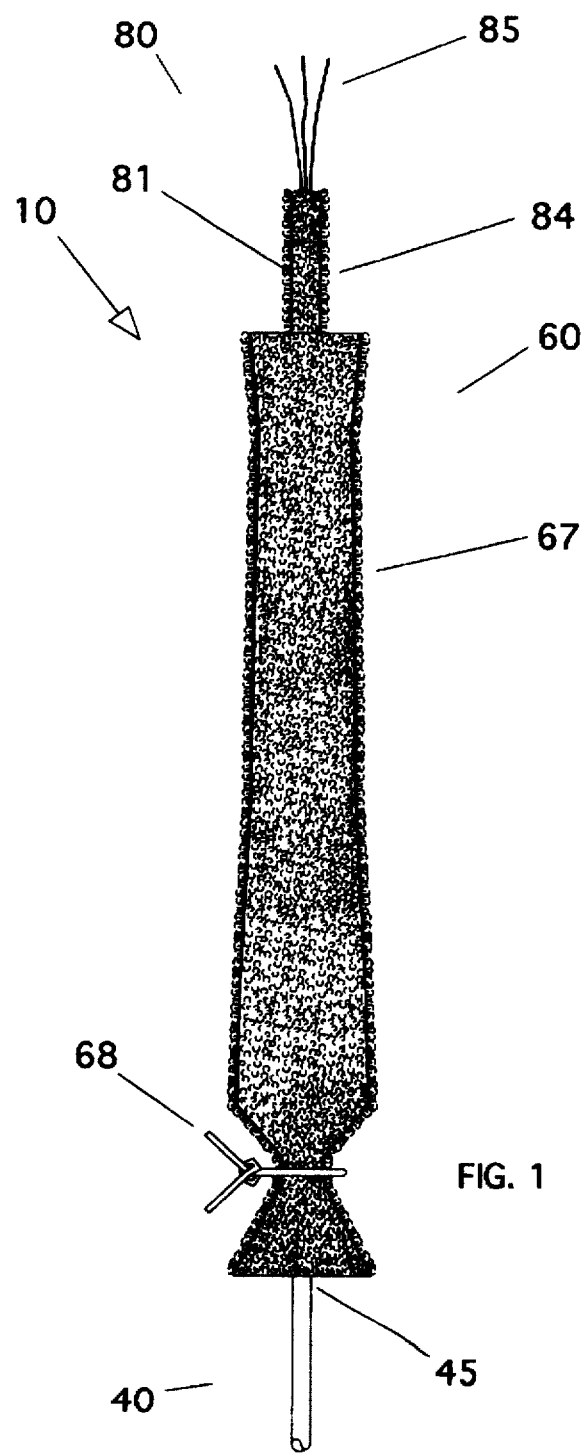
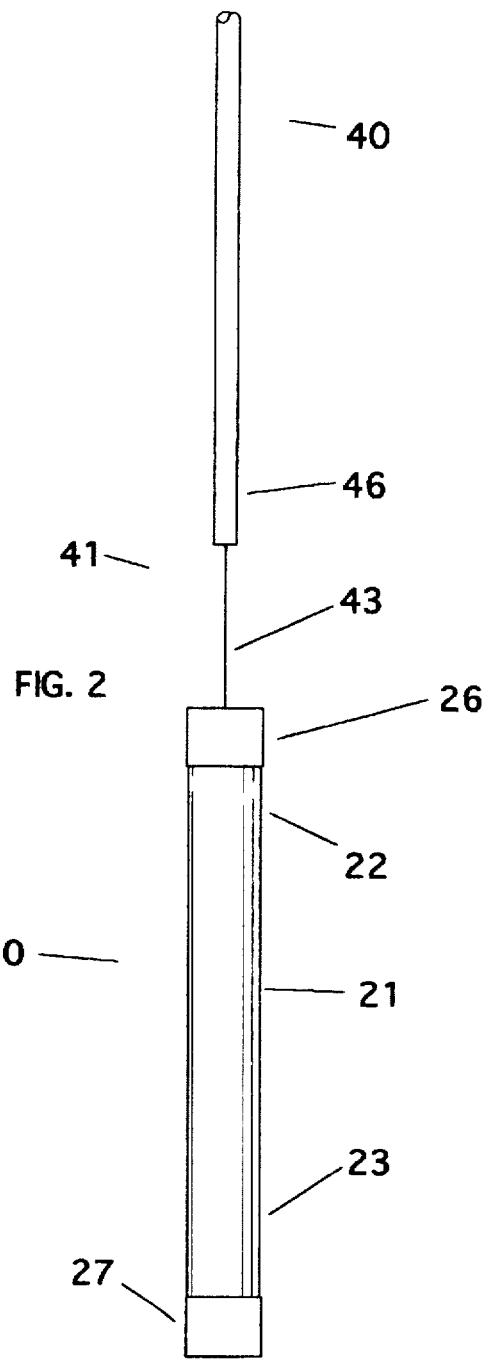
FIG. 1
FIG. 2

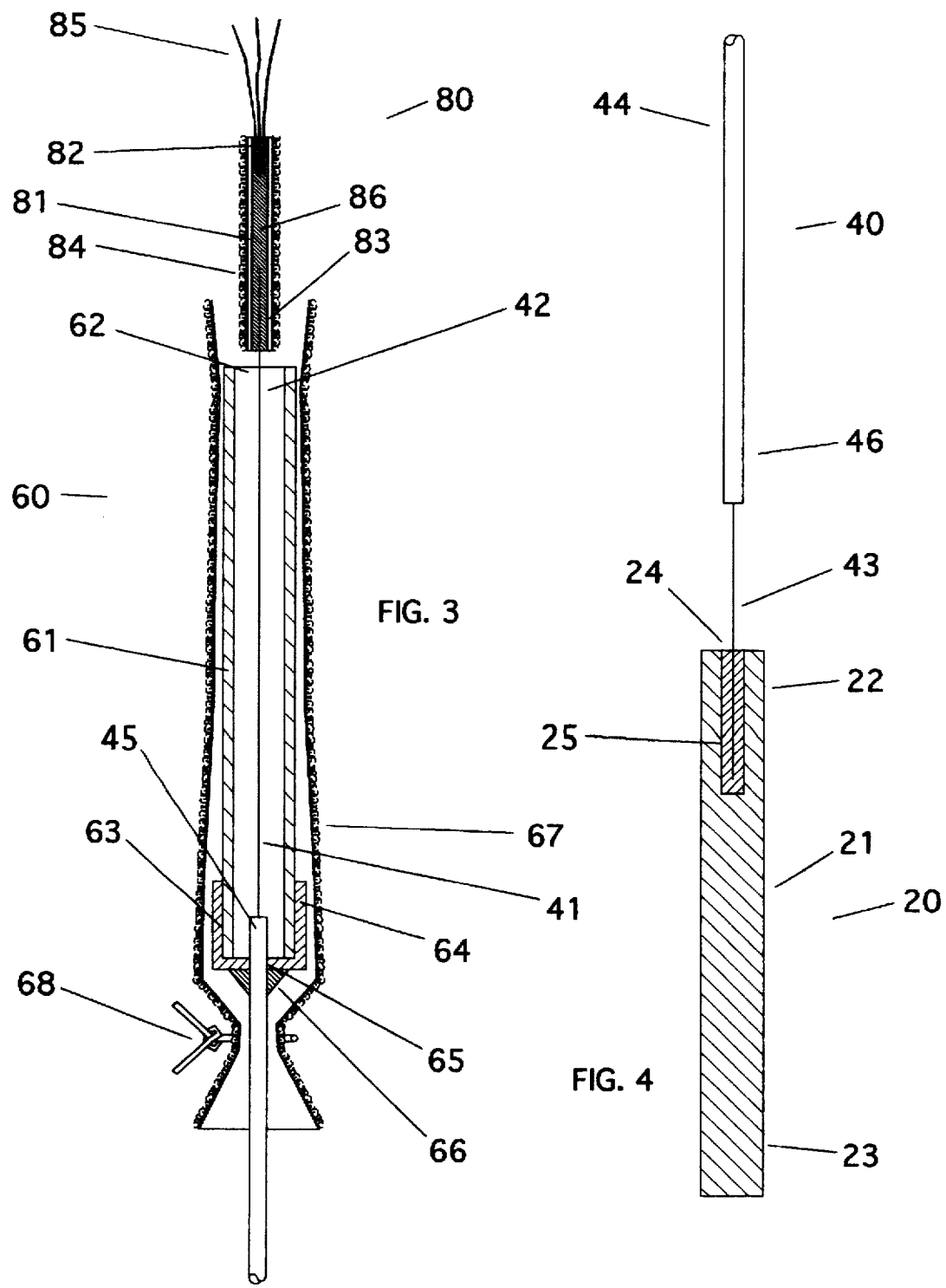

INTERACTIVE PET TOY

CROSS-REFERENCES

There are no applications related to this application filed in this or any foreign country.

BACKGROUND

The prior art is replete with devices and toys for promoting play and interaction between pet and owner. Such toys include a large number that resemble a fishing pole having a toy carried on the end of a string. These toys can entertain a cat; however, often the cat has sufficient insight to understand that its owner is indirectly operating the toy. Once realized, the cat's attention tends to be divided between the toy and the owner.

Motor powered toys are also known, having a supported toy that is moved mechanically in a manner that may attract the cat. However, this type of device does not promote interaction between the cat and the owner.

The above games tend to be of a type that may be labeled "pursuit-type" games, in that the toy is moved, either by the owner or a machine, and the cat chases it. This type of game depends for its entertainment value on the cat being close enough to success in catching the toy to make the cat attempt to catch it, yet not close enough that it is overly easy. Such games often become equated by the cat to the game of "fetch", in which they have no interest.

For the foregoing reasons, there is a need for a new type of pet and owner game that is more entertaining than the above summarized games. The new game should provide a structure that promotes a game that is of a type that is more nearly related to the human game of hide-and-seek, or the baby game of peekaboo, and that will capitalize on cats' and other pets' innate interest in hit-and-run and ambush-type games where the hunter is rewarded for his patience. The game should be attractive to both young and old cats, as well as other pets, and should maximize interaction between the pet and owner, while somewhat downplaying the need for continuous strenuous physical activity on the part of the pet, which may result in lessened interest.

SUMMARY

The interactive toy for a cat or other pet of the present invention provides some or all of the following structures:

(a) A mouse, or similar toy, which may be extended into the view of the cat and retracted into a tubular housing by manual manipulation of the driving cable by the user. In a preferred embodiment of the invention, the mouse may additionally provide:

(a) A generally tubular body having a forward end and a rearward end.

(b) A fuzzy cloth cover, carried by the tubular body, in a tight-fitting manner. And, (c) A plurality of whiskers or semi-rigid strings, extending from the forward end of the tubular body.

(b) A driving cable, which allows the user to move the mouse into and out of the cat's field of view. In a preferred embodiment of the invention, the driving cable may provide structures similar to a bicycle brake cable, including:

(a) An inner cable, having a forward end and a rearward end, with the forward end attached to the mouse and the rearward end attached to the handle. And, (b) An outer cable, having a forward end and a rearward end, where the forward end is attached to the below described tubular housing and the rearward end may be manually held by the user.

(c) A tubular housing which is used as a place to hide the mouse from the cat for brief periods In a preferred embodiment of the invention, the tubular housing provides an open forward end and a closed rearward end, and may additionally provide:

(a) An end cap, carried by the rearward end, having a hole sized to allow the forward end of the outer cable to pass. The end cap carries fastening means for securing the forward end of the outer cable to the end cap.

(b) A cloth cover, carried by the tubular housing. And, (c) A tie, tied about the cloth cover and the forward end of the outer cable. And, (d) A handle, which the user may grasp in a first hand, while holding the rearward portion of the outer cable in a second hand, to extend and retract the mouse. In a preferred embodiment of the invention, the handle provides a cylindrical body having a forward end and a rearward end, the forward end having fastening means for attachment of the handle to the rearward end of the inner cable.

It is therefore a primary advantage of the present invention to provide a novel interactive toy that is attractive and entertaining to both pets and their owners.

Another advantage of the present invention is to provide a novel interactive pet toy that is inexpensive to manufacture in a high quality manner.

A still further advantage of the present invention is to provide a novel interactive cat toy that capitalizes on cats' natural hunting and stalking instincts, and interest in the games of peekaboo, hit-and-run, ambush and sneak-attack.

DRAWINGS

These and other features, aspects, and advantages of the present invention will become better understood with regard to the following description, appended claims, and accompanying drawings where:

FIG. 1 is a side view of the tubular housing, mouse and a forward portion of the driving cable of a version of the pet toy of the invention;

FIG. 2 is a side view of the handle and rearward portion of the driving cable of the pet toy of FIG. 1;

FIG. 3 is a cross-sectional view of the elements of FIG. 1; and

FIG. 4 is a cross-sectional view of the elements of FIG. 2.

DESCRIPTION

Referring generally to FIGS. 1–4, a version of an interactive pet toy 10 constructed in accordance with the principles of the invention is seen. The pet toy provides a tubular housing 60 having a toy mouse 80 that is extended from and retracted into the tubular housing by means of a bicycle brake or similar driving cable 40 that is manually operated by the pet's owner using a handle 20. The tubular housing carries a decorative cloth cover 67 and is closed at one end by an end cap 64 having a drilled hole 65 through which the bicycle cable passes. The outer hollow portion 44 of the bicycle cable is fastened to the end cap, while the inner wire cable 41 extends through the tubular housing where it is attached to the mouse. The mouse provides a tubular body 81 having a cloth covering 84. Whisker-like semi-rigid filaments 85 extend from the forward end of the body. In the preferred embodiment, semi-rigid plastic string filaments are used, but leather laces or other material may be used. The tubular body 81 is filled with glue or caulk 86, which keeps the whiskers and the inner wire cable securely fastened.

A mouse 80, or similar toy, may be extended into the view of the cat or other pet and retracted into an enclosed typically tubular housing 60 out of the cat's view by manual manipulation by the user. A tubular body 81 of the mouse provides a forward end 82 and a rearward end 83. In the preferred embodiment, the tubular body is made of a 3 inch long, 0.5 inch diameter tube made of pvc plastic or other suitable material. A covering 84 is typically of a fuzzy cloth material, but other types of coverings may be used. The covering 84 is intended to make the product more attractive, both to pets and to the commercial marketplace. The covering may have a multi-colored or animal fur-like appearance, to increase the interest of the cat. In the preferred embodiment, whiskers 85 extend from the forward end of the tubular body 81 a distance of approximately 3 inches. The whiskers 85 are typically held in place by glue or caulk filling 86, or alternatively by other fasteners which may be selected to minimize manufacturing costs. The whiskers may be made from semi-rigid plastic filaments, leather boot laces or other suitable material. The combined effect of the covering 84, fur-like coloration, and whiskers 85 is to make the mouse 80 attractive to cats, thereby increasing cats' interest and the effectiveness of the toy.

A driving cable 40 allows the user to move the mouse into and out of the cat's field of view. In a preferred embodiment of the invention, the driving cable is made from a bicycle brake cable, which allows the user to push and pull the inner wire cable 41 having the mouse attached, while typically holding stationary the outer hollow cable 44 which is attached to the housing 60 at the forward end. Pulling the inner wire cable 41 retracts the mouse into the housing 60, while pushing the inner wire cable extends the mouse from the housing.

As seen in the drawings, the driving cable 40 is formed form a bicycle cable having an inner wire cable 41 and an outer hollow cable 44. The inner wire cable 41 provides a forward end 42 and a rearward end 43. The forward end is attached to the mouse 80, typically by inserting the end into the glue filling 86 while still liquid, or by suitable alternative fastening means. The rearward end 43 is attached to the handle 20 by means of glue or caulk 25 in drilled hole 24 or other suitable alternative fastening means. Similarly, the outer hollow cable 44 provides a forward end 45 and a rearward end 46. The forward end 45 is attached to the end cap 64 of the tubular housing 60 by caulk or glue 66. The rearward end 46 is typically held in the left hand of a right-handed user during operation.

A tubular housing 60 is used to hide the mouse 80 from the cat or other pet for brief periods. This promotes the game of peekaboo, and allows the cat to ambush the mouse when it appears. In a preferred embodiment of the invention, the tubular housing provides a tubular body 61 having an open forward end 62 and a closed rearward end 63. The rearward end is closed by an end cap 64 that may be glued in place. The tubular body may be made from an approximately 8 inch length of 1 inch diameter pvc pipe, or similar materials. The end cap 64 provides a centrally drilled hole 65 which allows approximately 1 inch of the forward end 45 of the outer hollow cable 44 of the driving cable 40 to pass into the tubular housing. Fastening means such as caulk or glue 66 or other fasteners connect the forward end 45 of the outer cable to the end cap 64.

The tubular housing also provides a cloth cover or sleeve 67, which encloses the tubular body 61 and end cap 64 and typically extends approximately one-half inch beyond the open forward end 62 of the tubular body. The cloth cover may be made of any fabric and in any color, but is typically made of a thick, soft and fuzzy fabric that is not damaged by a cat's claws. A fastening tie 68 bunches the cover 67 around the forward end 45 of the outer hollow cable 44.

A handle 20, which the user may grasp in a first hand, while holding the rearward end 46 of the outer cable 44 in a second hand, allows the user extend and retract the mouse 80. In the preferred embodiment of the invention, the handle 20 is made of a cylindrical wood body 21 having a forward end 22 and a rearward end 23 and some fastening means for connecting the body 21 to the rearward end 43 of the inner wire cable 41. Other materials may be used to form the body 21, if desired, to reduce manufacturing costs. A forward and a rearward end cap 26, 27 are fastened in place about the ends of the body 21. The forward end 22 typically provides fastening means such as a drilled hole 24 filled with glue 25, allowing for attachment of the handle to the rearward end 43 of the inner cable 41.

To use the interactive pet toy, the rearward end 46 of the outer cable 44 is held in a first hand, while the handle 20 is moved by a second hand, causing the mouse 80 attached to the inner wire cable 41 to move in and out of the tubular housing 60. The cat or other pet in turn responds to the movement of the mouse.

The invention resides not in any one of these features per se, but rather in the particular combination of all of them herein disclosed and claimed and it is distinguished from the prior art in this particular combination of all of its structures for the functions specified.

The previously described versions of the present invention have many advantages, including a primary advantage of providing a novel interactive pet toy that is attractive and entertaining to both pets and their owners.

Another advantage of the present invention is to provide a novel interactive pet toy that is inexpensive to manufacture in a high quality manner.

A still further advantage of the present invention is to provide a novel interactive cat toy that capitalizes on cats' natural hunting and stalking instincts, and interest in the games of peekaboo, hit-and-run, ambush and sneak-attack.

Although the present invention has been described in considerable detail and with reference to certain preferred versions, other versions are possible. For example, a number of variations are easily seen that could be made to the mouse 80 or the housing 60, while still in keeping with the spirit of the invention. Moreover, while the invention has been described primarily from the point of view of use with a cat, it is also intended for use with pets of other types. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A pet toy, comprising:
 (A) a mouse, comprising:
  (a) a tubular body having a cloth cover; and
  (b) a plurality of whiskers, extending from the forward end of the tubular body and (B) a driving cable, comprising
   (a) an inner cable, having a forward end and a rearward end, the forward end attached to the mouse; and
   (b) an outer cable, having a forward end,
(C) a housing, having first fastening means for securing the forward end of the outer cable; and
(D) a handle, the handle having a second fastening means, carried by the handle, for attaching to the rearward end of the inner cable to the handle.

2. The pet toy of claim 1, in which the housing additionally comprises:
   (a) a tubular body having a forward end and a rearward end; and
   (b) a cloth cover, carried by the tubular body.

3. The pet toy of claim 2, in which the first fastening means comprises an end cap, carried by the rearward end of the tubular body, having a hole sized to allow the forward end of the outer cable to pass, having fastening means for securing the forward end of the outer cable to the end cap.

4. A pet toy, comprising:
   (a) a mouse, having a tubular body having a forward end and a rearward end, the mouse additionally comprising:
      (a) a cloth cover, carried by the tubular body; and
      (b) a plurality of whiskers, extending from the forward end of the tubular body;
   (b) a driving cable, comprising:
      (a) an inner cable, having a forward end and a rearward end, the forward end attached to the mouse; and
      (b) an outer cable, having a forward end and a rearward end;
   (c) a tubular housing, having a forward end and a rearward end, the tubular housing additionally comprising:
      (a) an end cap, carried by the rearward end, having a hole sized to allow the forward end of the outer cable to pass, having first fastening means, carried by the end cap, for securing the forward end of the outer cable to the end cap;
      (b) a cloth cover, carried by the tubular housing; and
      (c) a fastening tie, tied about the cloth cover and the forward end of the outer cable; and
   (d) a handle, having second fastening means for attaching the handle to the rearward end of the inner cable.

* * * * *